United States Patent [19]

Hill

[11] 4,293,311

[45] * Oct. 6, 1981

[54] PHOSPHORIC ACID CRYSTALLIZER UNDERFLOW RETURN

[75] Inventor: Richard N. Hill, Lakeland, Fla.

[73] Assignee: W. R. Grace & Co., New York, N.Y.

[ * ] Notice: The portion of the term of this patent subsequent to Aug. 29, 1995, has been disclaimed.

[21] Appl. No.: 110,805

[22] Filed: Jan. 10, 1980

[51] Int. Cl.³ ..................... B01D 9/02; C01B 25/234
[52] U.S. Cl. .................................. 23/301; 423/321 R
[58] Field of Search ................. 23/293 R, 295 R, 300, 23/301; 423/317, 321 R

[56] References Cited

U.S. PATENT DOCUMENTS

| 3,528,771 | 9/1970 | Shearon et al. |
| 4,048,289 | 9/1977 | Pierres. |
| 4,110,422 | 8/1978 | Hill ..................................... 423/317 |
| 4,164,550 | 8/1979 | Hill ..................................... 423/321 R |

Primary Examiner—Bradley Garris
Attorney, Agent, or Firm—Charles L. Harness

[57] ABSTRACT

In the Hill phosphoric acid process the crystallizer underflow is divided into a major stream and a minor stream. The major stream goes to the clarifier and the minor stream to the aluminum silicate addition vessel.

2 Claims, 1 Drawing Figure

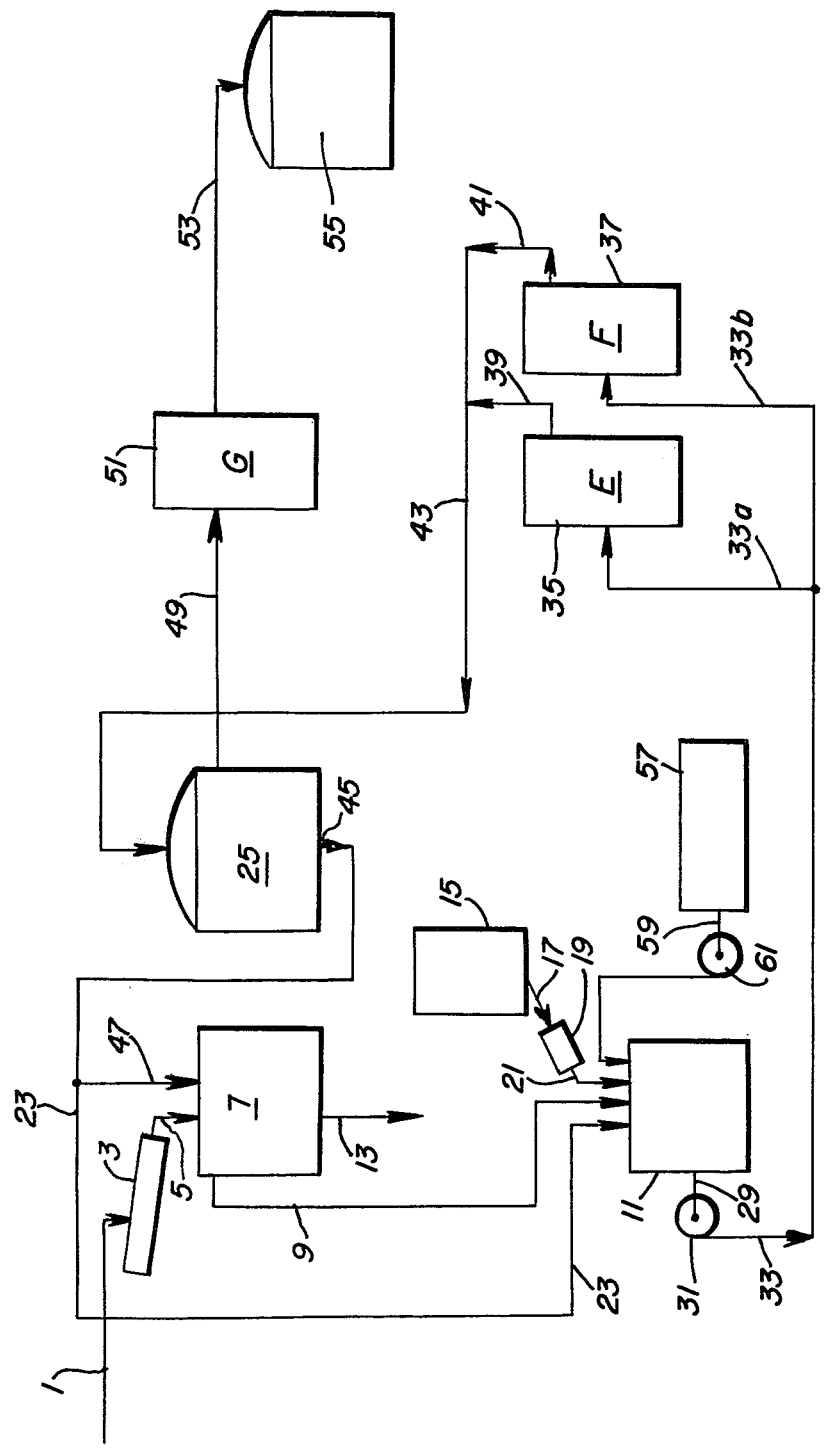

PHOSPHORIC ACID CRYSTALLIZER UNDERFLOW RETURN

A related application in U.S. Ser. No. 111,013, filed Jan. 10, 1980 by Richard Newton Hill and Moises Gali Sanchez for "Oxidative Control of Post Precipitation in Phosphoric Acid."

The instant invention is directed to an improvement in the Hill phosphoric acid process. It is particularly useful in treatment of high-iron feeds (rock and dilute acid) in which some of the iron is present in ferrous form. In accordance with the invention, $Fe^{++}$ in the dilute acid (26–36% $P_2O_5$) is oxidized to $Fe^{+++}$. The oxidation is conveniently carried out in the same vessel in which aluminum silicate is added to the acid. (See description of the Hill process, following.) This oxidation step results in less post-precipitation of the final product acid (57–60% $P_2O_5$). In a preferred modification, a minor stream from the underflow of the Hill crystallizer is also added to the aforesaid vessel.

U.S. Pat. No. 4 048 289 teaches oxidation plus return of sediment to the digestion system. However, the process requires addition of active silica, e.g., diatomaceous earth, and the oxidation results in increasing solubility of iron and aluminum compounds, whereas the instant invention uses oxidation in such a way as to precipitate iron and aluminum compounds as the phosphates. Further, the sediment returned in 4 048 289 is that in acid concentrated up to a point (42% $P_2O_5$) below that at which iron and aluminum phosphate precipitate (except in minor amounts). The sediment or sludge returned to the system in U.S. Pat. No. 4 048 289 is thus mostly gypsum and silico fluorides, in contrast to the instant sludge, the solids of which are $P_2O_5$-containing. U.S. Pat. No. 3 528 771 shows return of a similar calcium sulfate/silicofluoride sediment, to filtrate.

The drawing is a flow sheet showing application of the invention to a commercial scale Hill phosphoric acid process. The flow sheet starts with the so-called Number One filtrate (typically 28–30% $P_2O_5$). The preceding steps are conventional in the wet-process phosphoric acid art and are omitted from the flow sheet. They include, e.g., reaction of phosphate rock with sulfuric acid to produce crude dilute phosphoric acid and byproduct gypsum. The latter is filtered, and the final product of these initial operations is the Number One filtrate.

The Hill process for control of post precipitation in phosphoric acid is well known. It is the subject of U.S. Pat. Nos. 4 110 422 and 4 164 550, and at this writing it is in commercial use in facilities operated by W. R. Grace & Co. in Bartow, Fla.

In summary the Hill process starts with crude phosphoric acid, suitably 26–36% $P_2O_5$, e.g., the No. 1 filtrate, 28% $P_2O_5$. This material is thoroughly clarified with conventional flocculants. Then perlite or other suitable aluminum silicate is added, suitably in an amount of 8–16 pounds per ton of contained $P_2O_5$. The perlite-acid mix is then concentrated in conventional evaporators to about 50% $P_2O_5$ acid and this material is sent to a crystallizer where solids drop out of the acid. The underflow from the crystallizer is returned to the train, suitably to the clarifier. The overflow is generally concentrated further, e.g., up to 57–63% $P_2O_5$, and typically 60% $P_2O_5$. Under the preferred conditions of operation the product leaving the final evaporator is very low in solids and further precipitation is negligible, even during storage for some weeks thereafter and shipment of many hundreds of miles.

On the other hand, despite the general overall satisfactory character of the Hill process, it is susceptible to occasional variation, stemming generally from variations in phosphate rock analyses. Also, while post-precipitation under preferred conditions is generally quite small, there is frequently some post-precipitation. It is an object of this invention to further reduce post-precipitation under certain adverse conditions.

This invention is useful in cases where the weight ratio of total Fe (as $Fe_2O_3$) in $P_2O_5$ in the feed acid (line 1 in the drawing) is 0.04 or higher. Thus, in Example 1, total Fe as $Fe_2O_3$ is 1.94%, $P_2O_5$ is 28.2%, and 1.94/28.2 is 0.069, which value indicates that use of the invention will be useful in control of post-precipitation.

As practitioners in the art will note, such high Fe is rarely encountered in actual commercial practice. (A few phosphate rocks in Central Florida may from time to time produce acids with an Fe content as high as used here.) High Fe was synthetically provided in Example 1 by the addition of iron filings, which simultaneously reduced $Fe^{+++}$ to $Fe^{++}$.

The invention requires that all or substantially all $Fe^{++}$ be oxidized to $Fe^{+++}$. This is the main requirement, considered as a modification of the basic Hil process. Secondly, the $P_2O_5$ and the $Fe_2O_3/P_2O_5$ ratio have to be considered. In cases where (a) $P_2O_5$ in the acid from the first evaporator is 48% or less, e.g., 46–48%, and (b) the $Fe_2O_3/P_2O_5$ ratio as above defined is at least 0.05, e.g., 0.055–0.075, then, in that case a minor amount of the underflow from the crystallizer is to be sent to the perlite mix vessel, to serve as seed crystals in the crystallizer later on.

Referring now to the drawing, the incoming dilute feed acid enters the system via line 1. This acid is suitably the so-called No. 1 filtrate from the Prayon filter system in a wet process phosphoric acid reaction system. The No. 1 filtrate is well known to those skilled in the art and it contains typically phosphoric acid analyzing about 28% as $P_2O_5$. (The No. 1 filtrate material used in Example 1 analyzed 28.2% $P_2O_5$). The No. 1 filtrate is fed to launder 3, whence it exits via line 5 to clarifier 7. Clarifier 7 overflows via line 9 to perlite mix tank 11. The clarifier underflow exits via line 13 and is preferably returned to the reaction train, e.g., to a headbox, not shown. At 15 is shown the perlite storage container. This feeds via line 17 into perlite feeder 19 which exits via line 21 to mix tank 11. Line 23, constituting a minor stream from the underflow of crystallizer 25 (hereinafter described) also feeds into mix tank 11. Oxidant line 27 also feeds into mix tank 11. At 57 is shown oxidant storage, which feeds via line 59 through metering pump 61 to line 27, which feeds to mix tank 11. Exit line 29 leads from mix tank 11 through pump 31, thence via line 33 to evaporator E at 35 and evaporator F at 37. It will be noted that line 33 branches into line 33A proceeding to evaporator 35 and to 33B proceeding to evaporator 37. The concentrated product exiting from evaporator 35 exits via line 39 and that from evaporator 37 via line 41. Lines 39 and 41 join to form line 43 which feeds to crystallizer 25. The underflow from crystallizer 25 exits via line 45 which splits into two lines, namely line 23, and line 47. Most of the effluent in line 45 is fed to line 47, to the clarifier 7. A minor amount, under certain conditions, may be sent via line 23 to mix tank 11. Returning now to crystallizer 25 it will be noted that the overflow proceeds via line 49 to G-evaporator 51. Here the phosphoric acid is further concentrated, e.g., from about 50% up to about 60%. The final product exits via line 53 and is collected in product tank 55.

EXAMPLE 1

This was performed under laboratory conditions. However, the general flow sheet shown in the drawing would be applicable on a commercial scale, and reference to that flow sheet will be made in the course of this description. The effluent from the E and F evaporators, respectively 35 and 37, combined into line 43 analyzes 48% $P_2O_5$. This material is taken to crystallizer or settler 25. (In the actual laboratory work this settling was done in a much smaller vessel). The underflow from crystallizer/settler 25, exiting through line 45 is split into lines 23 and 47. This is done in a so-called "pants-leg splitter." This apparatus is well known to those skilled in the art and permits adjustment by the operator as to flow going through each leg. In this case 90% of the flow goes to clarifier 7. The remainder, about 10%, goes via line 23 to mix tank 11. Actually this minor flow can vary from about 5 to about 20%. These flows are, of course, by volume.

Continuing now with the laboratory work, the total clarifier overflow was 1428 grams. In commercial practice the clarifier overflow wound, as already described, proceed via line 9 to mixing tank 11. In the laboratory work three grams of perlite was added to the mix at this point. The mix contained 1.36% iron, as Fe. All iron at this point was in the divalent form, induced artificially by treating the mix with iron filings so as to reduce all trivalent iron to divalent iron. Measured as $Fe_2O_3$, the iron was 1.94%. The ratio of $Fe_2O_3$ to $P_2O_5$ in the mix was 1.94/28.2=0.0689. The crystallizer underflow recycled to mix tank 11 was 20 grams of slurry, which contained 15% by weight of solids. To this mix was added 35.5 grams of 25% hydrogen peroxide aqueous solution. This was predetermined to represent oxidation of 150% of the divalent iron to trivalent iron, basis the stoichiometric reaction of hydrogen peroxide with $Fe^{++}$ to form $Fe^{+++}$. As already described this material was mixed and further evaporated so as to provide phosphoric acid analyzing 46.7% $P_2O_5$; total Fe as Fe, 2.37%; Fe as $Fe_2O_3$, 3.39%; $Fe^{++}$, 0.04%; $H_2SO_4$, 4.10%; and solids, nil. The evaporated product analyzed, $Fe_2O_3$, 3.29 weight percent; divalent Fe, 0.04%; and solids, nil. This stream, as already stated, proceeds to the crystallizer represented as 25. The phenomena within the crystallizer were watched carefully. One layer of sediment came down fairly rapidly. After six hours another layer came down. In the commercially operated crystallizer settler shown at 25, the retention time is approximately 30 hours, so that plenty of time is allowed for collecting both types of sediments. Analyses of these two layers of sediments are given in Table 1. Overflow from the crystallizer, fairly well free of sediment, proceeds via line 49 to the G evaporator 51. Here the product is further concentrated to provide a $P_2O_5$ of 58.7 weight percent; all iron as Fe is 2.11%. Divalent iron is only 0.07% indicating the remainder of the iron to be present as ferric iron; sulfur as $H_2SO_4$ was 5.4%. The product was stored and examined for post-precipitation characteristics. Aside from a very little sediment, which appeared to be mostly calcium sulphate, there was no post precipitation during the next 70 days.

"Seed crystals" returned to tank 11 via line 23 appear to behave quite differently from perlite, at least in bench scale work. Thus, whereas perlite substantially dissolves when phosphoric acid is concentrated in Evaporators E and F (numbers 35 and 37 in the drawing), it appears that little or none of the seed crystals dissolve during this treatment, and most survive throughout the journey from tank 11 to crystallizer-settler 25.

Although the foregoing shows the addition of seed crystals to the perlite addition tank, actually they can be added anywhere along the flow sheet, between the clarifier 7 and the first stage evaporators, 35 and 37; e.g., direct to line 9, or to line 33, or to oxidant line 27.

Similarly, oxidation is not necessarily confined to the perlite addition tank 11, although this is preferred as a convenience. The oxidation step has been carried out before and after clarification in clarifier 7, and tests so far show no difference; which is to say, both products showed good post-precipitation control. Also, good results have been obtained on oxidizing 60% $P_2O_5$ with nitric acid.

TABLE 1

| Analysis of Crystallizer Sediment in Example 1 | | |
|---|---|---|
| | UPPER LAYER | LOWER LAYER |
| | Filtered and Air-dried | |
| $P_2O_5$ | 48.30 | 30.00 |
| CaO | 0.76 | 13.41 |
| $SiO_2$ | 0.25 | 4.05 |
| $Fe_2O_3$ | 20.25 | 10.20 |
| $Al_2O_3$ | 1.80 | 1.10 |
| F | 0.73 | 9.71 |
| $H_2SO_4$ | NIL | 15.00 |
| MgO | 0.29 | 0.24 |
| Solids | — | — |
| $Na_2O$ | 0.15 | 6.42 |
| $K_2O$ | 0.64 | 3.00 |
| Fe | 14.47 | 7.31 |
| $Fe^{++}$ | 0.03 | trace |
| | Methanol Washed | |
| $P_2O_5$ | 53.20 | 27.30 |
| CaO | 1.16 | 19.60 |
| $SiO_2$ | .35 | 5.00 |
| $Fe_2O_3$ | 13.10 | 8.20 |
| $Al_2O_3$ | 1.40 | 0.85 |
| F | 0.62 | 13.20 |
| $H_2SO_4$ | NIL | 21.80 |
| MgO | 0.14 | 0.13 |
| Solids | — | — |
| $Na_2O$ | 0.23 | 9.94 |
| $K_2O$ | 0.97 | 6.10 |
| Fe | 9.18 | 5.31 |
| $Fe^{++}$ | trace | 0.01 |

The above analyses suggest that the lower layer (first to precipitate) is a mix of calcium sulfate, a complex of ferric and alkali metal phosphates, and alkali metal fluosilicates. The upper layer appears to be mostly a ferric phosphate.

EXAMPLE 2

This was carried out in the same manner as Example 1, except that there was no diversion of crystallizer underflow to the perlite mix tank. Here, the product was concentrated to about 50% $P_2O_5$; 0.075 wt. % perlite (based on $P_2O_5$) was added in the mix tank; $Fe_2O_3/P_2O_5$ was about 0.045–0.05; $Fe^{++}$/Fe was about 0.08–0.10. Oxidation was with a stoichiometric amount of $H_2O_2$. Post-precipitation was negligible.

Divalent Fe

It might be supported that all Fe in phosphate rock has had time to oxidize completely to $Fe^{+++}$ during the course of geologic time. Nevertheless, typical Florida rock carries a sensible amount of Fe as $Fe^{++}$, and this carries over into acid made from the rock. It is theorized that accompanying organic matter reduces some of the $Fe^{+++}$ to $Fe^{++}$ in the rock and/or in the acid. Whatever the mechanism, $Fe^{++}$ is frequently found. If high-iron rock is used to make Hill acid, this $Fe^{++}$ is best "knocked down" as insoluble $Fe^{+++}$ compounds before shipment. This, of course, requires oxidation.

Example 1 above shows all Fe as $Fe^{++}$. This, of course, would not occur in commercial practice. The Example shows, however, that the invention works even though all the Fe may be present as $Fe^{++}$.

The Oxidation Step

As mentioned, the basic feature of this invention is oxidation of $Fe^{++}$ to $Fe^{+++}$ in a Hill phosphoric acid process as above defined, in cases of high iron as already described.

Oxidation is conveniently carried out in the same vessel to which the perlite or other aluminum silicate is added. It is evident that this additional step can be easily added to a conventional Hill operation with only minor modifications to the existing set-up.

In the two examples given, hydrogen peroxide (25% aqueous solution) is used as the oxidant. The stoichiometry assumed is

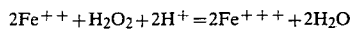

$$2Fe^{++} + H_2O_2 + 2H^+ = 2Fe^{+++} + 2H_2O$$

Oxidation has also been carried out with nitric acid and potassium permanganate with good results. Other oxidants can be used, e.g., ozone; sodium dichromate; chlorine or sodium hypochlorite, chlorates, potassium bromate and the like, also air and/or oxygen.

The amount of oxidant should be at least 100% of that required to oxidize all $Fe^{++}$ to $Fe^{+++}$. It is often desirable to use a stoichiometric excess of oxidant, e.g., 50% in the case of $H_2O_2$.

The oxidant materials can be used in various concentrations. Various concentrations of $H_2O_2$ are available, ranging from 3 to 98% (aqueous). The major grades sold by producers are 35, 50, 70, and 90% $H_2O_2$. These are all suitable; 25 or 50% is preferred.

Minor Stream of Crystallizer Underflow

Sending crystallizer underflow to the clarifier is conventional in the practice of the Hill process, as described in R. N. Hill's copending application U.S. Ser. No. 54,446, filed July 3, 1979, the entire contents of which are herein incorporated by reference. As shown in that application, sludge from the crystallizer, when sent to the clarifier, drops most of its solids to the bottom of the clarifier, where they leave with normal clarifier solids. The liquid portion of the crystallizer sludge is approximately 50% $P_2O_5$ acid, and this very valuable portion of the crystallizer underflow is recovered in the clarifier, where it may serve to increase the $P_2O_5$ content of the clarifier acid by a full percentage point or more, thereby saving the energy expended in initially evaporating that amount of acid to 50% or thereabouts. The advantages of crystallizer sludge return are fully retained in the instant invention, even though in one modification a minor portion of the crystallizer underflow is sent to the perlite mix vessel, thereby bypassing the clarifier. In this embodiment it will be evident that evaporation energy is not lost, since all the acid in the mix tank (11 in the drawing) proceeds directly to the E/F evaporators, 35 and 37. The small amount of sludge solids is retained in suspension throughout its journey to crystallizer 25, where eventually, after serving as nuclei for further crystals, it falls to the bottom of the crystallizer and exits as underflow, to repeat its flow path, at least in part. There is no solids buildup, because solids from the system as described in the drawing (clarifier underflow, line 13) go back to the headbox in the acid/rock reaction train, and to the extent they are not finally dissolved, they are collected in the gypsum filter cake. Thus very little actual $P_2O_5$ values are lost.

The amount of solids in the minor side stream 23 may vary, but typically it is 10 to 35 wt. % of the side stream. This is of course the same ratio as in the crystallizer underflow 45 and in the major stream 47. In a large scale operation solids in these three streams is typically 25 wt.%.

Even though crystallizer underflow return is not required with all oxidations, it will do no harm, and is merely superfluous, i.e., it adds a nominal amount to the cost of pumping the minor stream of underflow.

Variations in $P_2O_5$ of acid coming from the E/F evaporators, taken with variations in the iron to $P_2O_5$ ratio, may influence the amount of perlite to be added, and may influence the decision as to whether a minor stream of crystallizer underflow is to be used in addition to oxidation. Although some experimentation may be required, depending on rock analysis, the following Table 2 offers some useful guidelines. In this table, in the left-hand column the % $P_2O_5$ refers to the acid leaving the E/F evaporators (line 43); % of seed crystals is the weight of solids taken in the minor stream of crystallizer underflow (line 23), and is also based on the same $P_2O_5$. The $Fe_2O_3/P_2O_5$ ratio is calculated by first determining total Fe in line 9, clarifier overflow, then multiplying by a factor to convert to % $Fe_2O_3$, then dividing % $Fe_2O_3$ by % $P_2O_5$ in the dilute acid feed (e.g., the Number 1 filtrate). The $Fe^{++}/Fe$ ratio is the weight of $Fe^{++}$ in the acid in line 9, and Fe is total iron in line 9. Since oxidation is required for all operations, it is not separately stated as an option or variable in the table. In all cases 0.75 weight % of perlite was assumed added to the acid (as in mixing vessel 11 in the drawing). The % was based on the weight of $P_2O_5$ in the acid added to the mixing vessel (i.e., line 9).

TABLE 2

| Wt % $P_2O_5$ in acid | Seed Crystals Return, wt % | $Fe_2O_3/P_2O_5$ weight ratio | $Fe^{++}/Fe$ weight ratio |
|---|---|---|---|
| 51 | 0 | 0.04–0.045 | 0.08–0.10 |
| 50 | 0 | 0.045–0.05 | 0.06–0.08 |
| 49 | 0 | 0.05–0.055 | 0.04–0.06 |
| 48 | 0.5 | 0.055–0.06 | 0.03–0.04 |
| 47 | 0.5 | 0.06–0.065 | 0.025–0.03 |
| 46.5 | 0.75 | 0.065–0.07 | 0.02–0.025 |
| 46 | 0.75 | 0.07–0.075 | less than 0.02 |

Even in cases where seed crystal return is not actually needed (having reference to the above table) it does no harm to the system to add seeds along with oxidation. Conversely, there are indications that seeding may be beneficial even without oxidation, in certain borderline situations, e.g., where $Fe_2O_3/P_2O_5$ in the No. filtrate is 0.03–0.04.

In a generalized set of conditions, using both $Fe^{++}$ oxidation and crystallizer-settler seed return, the invention involves the following:

(1) Perlite addition (21), as a fraction of clarifier oveflow (13), about 0.04–0.8%, and preferably about 0.2%.

(2) Concentration of acid in E and F evaporators (35 and 37) to about 46–51% $P_2O_5$, and preferably about 46–48% $P_2O_5$.

(3) Using an excess of oxidant to ensure oxidation of $Fe^{++}$ in the acid to $Fe^{+++}$, suitably about 125–175% of stoichiometric of a 25% aqueous hydrogen peroxide solution.

(4) Providing sufficient retention time in the crystallizer-settler 25 to drop out 2 sets of precipitates or crystals in sequence from a given portion of acid entering the crystallizer; suitably a retention time of 6–60 hours, and preferably about 30 hours. These precipitates have substantially the analyses stated in Table 1. Obviously, in a continuous operation the precipitation of both the "early" and "late" solids will be continuous, and it is neither feasible nor desirable to attempt a separation. The crystallizer-settler underflow will of course comprise both types.

(5) Taking an 80–95%/5–20% split in crystallizer-settler underflow (45), with 80–95% to clarifier (7) and the remaining 5–20% to perlite mix tank (11). Preferably the split is about 90%/10%.

(6) And finally evaporating the acid to about 57–63% $P_2O_5$, preferably about 58–60% $P_2O_5$.

The invention finds particular utility for post-precipitation control and sludge return (from crystallizer-settler 25 to clarifier 7) in treating acid made from high iron phosphate rock, or acid which for one reason or another contains a high concentration of Fe, part of which is the $Fe^{++}$ form. Oxidation is useful when the $Fe_2O_3/P_2O_5$ ratio in the rock is about 0.04–0.075 and the $Fe^{++}/Fe$ ratio is higher than 0.02. When the said $Fe_2O_3/P_2O_5$ ratio is in the range 0.055–0.075, or higher, than seed crystal return should also be used, as above explained. See Table 2.

Analytical

Except for solids and iron, analyses were made by procedures in "Methods Used and Adopted by the Association of Florida Phosphate Chemists," Fifth Ed., 1970 ("AFPC"). Where more than one method is provided, the selections were as follows:

P, Photometric method (phosphate rock), p. 80.
Aluminum oxide, Atomic absorption method, p. 95.
F, Specific ion electrode method, p. 104A.
Water, Karl Fischer method, p. 127.
Phosphoric acid in phosphoric acid, Total phosphoric acid method, p. 132.

Solids were determined by the following procedure:
Apparatus
 a. Vacuum filtration system
 b. Drying oven adjusted to 105° C.
 c. Gooch crucible, porcelain, with perforated bottom
Reagents:
 a. Asbestos—Powminco brand or equivalent, special for Gooch crucibles, acid washed. This grade asbestos as received should be thick slurried with water and blended in a Waring blender or equivalent for 10 seconds. The blended slurry should then be placed in an Erlenmeyer flask and washed 3–5 times by adding distilled water and decanting to remove the extremely fine material. The washing is accomplished by thoroughly shaking the blended asbestos with each water wash and then allowing it to settle for 5–10 minutes before decantation of the excess water and fine material.
 b. Methanol, absolute.
Determination Prepare the Gooch crucible with a pad of asbestos which filters freely under medium suction. (In lieu of asbestos, glass fibers can be used.) Pad should be thick enough to retain all suspended solids. Wash pad several times with distilled water, finally with methanol, and place in drying oven at 105° C. for a minimum of one hour. Remove from drying oven and place in desiccator until cool. Reject or rework crucibles which visually show evidence of pad separation from crucible walls. Weigh crucible rapidly and record tare weight. Resuspend solids in sample by shaking thoroughly. Immediately weigh approximately five-ten grams of sample, accurately weighed, into the crucible. Place the crucible and contents on a filter flask and filter with strong vacuum until all of the liquid portion has been filtered through. Wash the solids five times with five ml portions of methanol allowing each wash to filter through completely. Remove crucible from suction and place in the drying oven at 105° C. for a minimum of one hour. Cool in desiccator and weigh rapidly as soon as cool.

$$\% \text{ Suspended Solids} = \frac{\text{Weight of Residue}}{\text{Weight of Sample}} \times 100$$

In these analyses, samples are well shaken, then immediately analyzed. Thus, values for $P_2O_5$, lime, silica, iron, alumina, etc. include components in both liquid and solid phases.

Ferrous and ferric iron were determined by the following procedure:
Reagents
 a. Standard Potassium Dichromate
  A 0.1 N. solution is made by dissolving 4.904 grams and diluting to one liter with distilled water.
 b. Stannous Chloride
  Sixty grams of the crystallized salt is dissolved in 600 ml of concentrated HCl and made up to 1 liter with distilled water.
 c. Phosphoric Acid-Sulfuric Acid Mixture
  150 ml concentrated $H_2SO_4$ and 150 ml concentrated $H_3PO_4$ are diluted to 1 liter with distilled water.
 d. Mercuric Chloride
  A saturated solution of $HgCl_2$ (60–70 grams per liter) is made.
 e. Diphenylamine
  One gram of diphenylamine is dissolved in 100 ml of $H_2SO_4$.
Determination A 5.00 gram sample of acid is weighed into a 250 ml beaker. About 100 ml of distilled water is added to the beaker. Then 15 ml of the phosphoric-sulfuric acid mixture and 4 drops of diphenylamine are added. The solution is stirred and potassium dichromate is added drop by drop until a deep purple color develops. The milliliters of potassium dichromate is recorded and used in the calculation for ferrous iron.

A total iron is run by weighing out 5.00 grams into a 250 ml beaker, adding 25 ml of 1:1 HCl and about one ml of 2% potassium permanganate solution, placing this on the hot plate and boiling until the color of permanganate is destroyed. The iron is then reduced by adding stannous chloride drop by drop until the solution is colorless. Add one-two drops in excess. The solution is allowed to cool to room temperature. The solution is diluted to 100 ml and 15 ml saturated mercuric chloride is added. Add 15 ml of phosphoric-sulfuric acid mixture and 4 drops of diphenylamine indicator. Potassium dichromate is added drop by drop to the stirred solution until a deep purple end point develops.

Calculation:

$$\% \text{ Ferrous Iron} = \frac{\text{ml Titration for Ferrous}}{\text{wt of sample}} \times .005585 \times 100$$

$$\% \text{ Total Iron} = \frac{\text{ml Titration for total}}{\text{wt of sample}} \times .005585 \times 100$$

% Ferric Iron = % Total Iron − % Ferrous Iron

I claim:

1. In the method of making wet process phosphoric acid analyzing about 57–63% $P_2O_5$ prepared by steps including (a) clarifying crude feed acid in a clarifier, said feed acid analyzing about 26–36% $P_2O_5$, having an Fe (as $Fe_2O_3$): $P_2O_5$ weight ratio in the range of 0.03–0.04; and at least some of said Fe being present as $Fe^{++}$;

(b) treating the clarified acid with aluminum silicate in an aluminum silicate treatment zone in the absence of an added oxidant;

(c) concentrating the treated acid to about 46–51% $P_2O_5$;

(d) settling solids in the concentrated acid in a crystallizer-settler providing an overflow and an underflow;

(e) sending crystallizer-settler underflow to the clarifier in (a);

(f) further concentrating the overflow in (d) to about 57–63% $P_2O_5$; the improvement in which the underflow in (d) is divided into a major stream comprising 80–95% of the underflow, and a minor stream comprising the balance; and sending the major stream to the clarifier in (a) and the minor stream to the aluminum silicate treatment zone in (b), whereby the post-precipitation characteristics of the acid are improved.

2. Method according to claim 1 in which the aluminum silicate is perlite.

* * * * *